(12) United States Patent
Laricchia

(10) Patent No.: US 10,493,381 B2
(45) Date of Patent: Dec. 3, 2019

(54) SULFIDE OXIDATION PROCESS AND APPARATUS

(71) Applicant: UOP LLC, Des Plaines, IL (US)

(72) Inventor: Luigi Laricchia, Arlington Heights, IL (US)

(73) Assignee: UOP LLC, Des Plaines, IL (US)

(*) Notice: Subject to any disclaimer, the term of this patent is extended or adjusted under 35 U.S.C. 154(b) by 244 days.

(21) Appl. No.: 15/210,510

(22) Filed: Jul. 14, 2016

(65) Prior Publication Data

US 2017/0014751 A1    Jan. 19, 2017

Related U.S. Application Data

(60) Provisional application No. 62/193,754, filed on Jul. 17, 2015.

(51) Int. Cl.

| | |
|---|---|
| *B01D 19/00* | (2006.01) |
| *B01D 17/02* | (2006.01) |
| *B01D 53/04* | (2006.01) |
| *B01D 53/14* | (2006.01) |

(52) U.S. Cl.
CPC ...... *B01D 17/0211* (2013.01); *B01D 19/0042* (2013.01); *B01D 53/0423* (2013.01); *B01D 53/14* (2013.01); *B01D 53/1487* (2013.01); *B01D 2252/205* (2013.01); *B01D 2257/30* (2013.01); *B01D 2257/306* (2013.01); *B01D 2257/90* (2013.01); *B01D 2259/402* (2013.01); *B01D 2259/40084* (2013.01)

(58) Field of Classification Search
CPC ....... B01D 17/02–17/048; B01D 19/00; B01D 19/0042; B01D 53/00–53/965; B01D 2252/205; B01D 2257/30; B01D 2257/306; B01D 2257/90; B01D 2259/40083–2259/40086; B01D 2259/402

USPC .............. 95/265; 585/800–811; 96/197–199
See application file for complete search history.

(56) References Cited

U.S. PATENT DOCUMENTS

| | | | |
|---|---|---|---|
| 8,173,856 | B2 | 5/2012 | Tertel |
| 8,277,641 | B2 | 10/2012 | Tertel et al. |
| 8,906,230 | B2 | 12/2014 | Varadi et al. |
| 2013/0220888 | A1 | 8/2013 | Tertel et al. |
| 2014/0048484 | A1 | 2/2014 | Laricchia et al. |
| 2014/0197109 | A1 | 7/2014 | Laricchia et al. |
| 2014/0202963 | A1 | 7/2014 | Laricchia et al. |

(Continued)

FOREIGN PATENT DOCUMENTS

CN            102671907 A      9/2012

*Primary Examiner* — T. Bennett McKenzie

(57) ABSTRACT

A separation zone and a method of separating a mixed stream are described. The separation zone includes a tank and a stack having a gas outlet. A first baffle is positioned between the sides and defines a disulfide liquid compartment. The stack is positioned above the disulfide liquid compartment. A second baffle is positioned between the first baffle and the second side and defines an alkali compartment. The second baffle has a height less than the height of the first baffle. A third baffle is positioned between the first and second baffles. The bottom of the third baffle is at a height less than the height of the second baffle, and the top of the third baffle is at a height greater than the height of the first baffle.

20 Claims, 1 Drawing Sheet

(56) References Cited

U.S. PATENT DOCUMENTS

2014/0235897 A1    8/2014  Tertel et al.
2014/0371507 A1*  12/2014  Laricchia ........... B01D 17/0211
                                                585/802

* cited by examiner

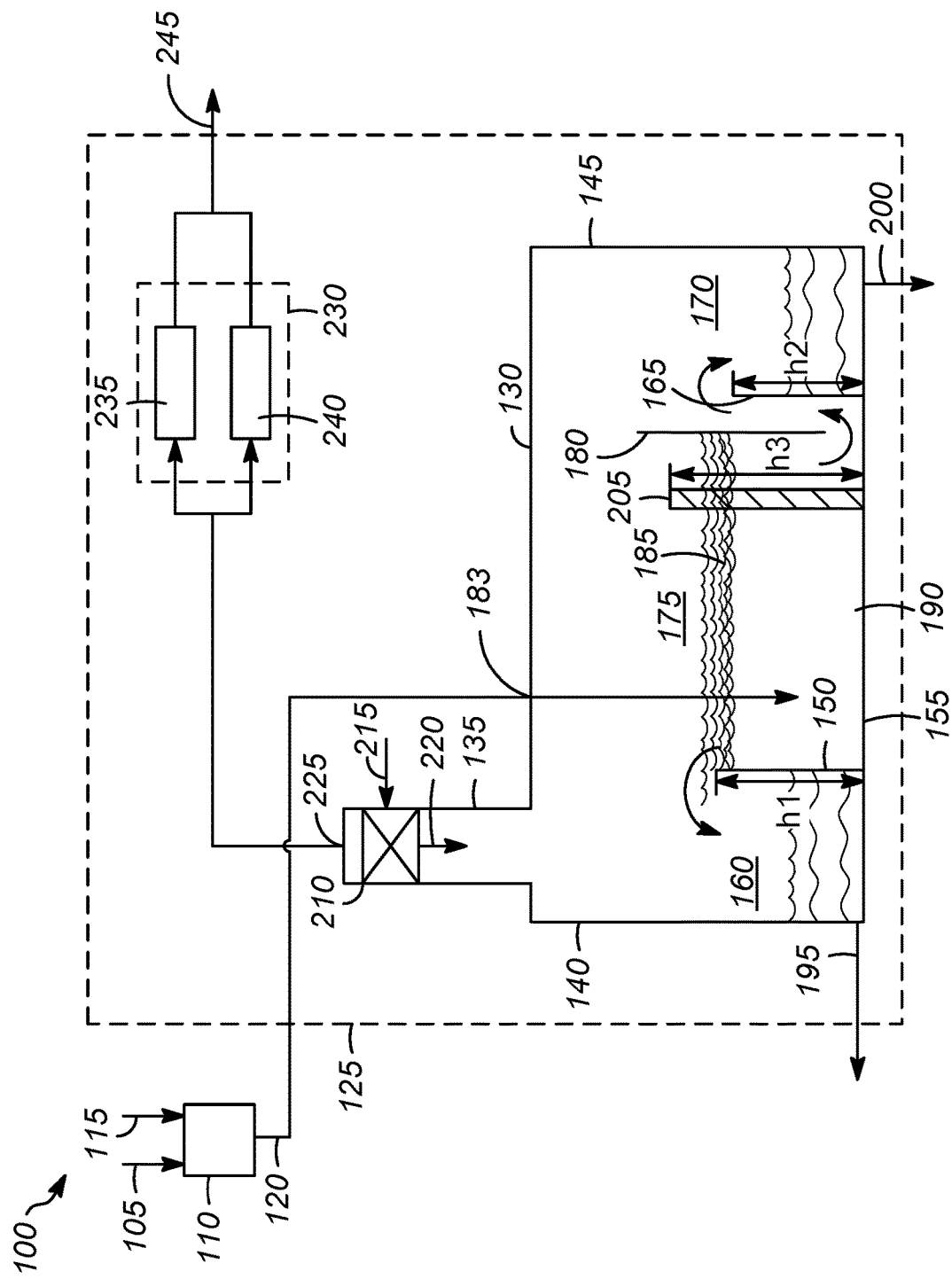

SULFIDE OXIDATION PROCESS AND APPARATUS

CROSS-REFERENCE TO RELATED APPLICATION

This application claims priority from Provisional Application No. 62/193,754 filed Jul. 17, 2015, the contents of which are hereby incorporated by reference.

BACKGROUND OF THE INVENTION

Often, hydrocarbon and gas streams are treated to remove sulfur-containing compounds, such as sulfides and mercaptans. Generally, such compounds are removed because of their malodorous scent.

Mercaptans can be designated R—S—H where R is often a light hydrocarbon radical such as methyl or ethyl. Typically, mercaptans concentrate in hydrocarbon liquid streams separated in a process facility. Many processes can be used to remove mercaptans and other sulfur-containing compounds. Often, such processes can use an alkaline stream contacting the hydrocarbon stream in an extractive system.

After extraction, the alkaline stream may be regenerated. The sulfides are typically removed in a sulfide oxidation reactor which also oxidizes the mercaptides to disulfides. The effluent from the sulfide oxidation reactor contains alkali, disulfide oils, and various vapors. The effluent is then separated in a disulfide separator into a lean alkaline stream, a disulfide oil stream, and a vapor stream which includes primarily air and small amounts of water, hydrocarbons, and disulfide oils. Typically, the vapor stream can contain up to about one mole percent disulfide.

There is a need for methods of processing the rich alkali which provide improved removal of the disulfides from the regenerated liquid alkaline stream and the vapor stream.

SUMMARY OF THE INVENTION

One aspect of the invention involves a separation zone. In one embodiment, the separation zone includes a tank having an inlet, a disulfide liquid outlet, an alkali liquid outlet, and a stack having a gas outlet. The tank has front and back sides and first and second sides. There is a first baffle extending upward from the bottom of the tank and having a first height, the first baffle positioned between the first and second sides and extending from the front side to the back side, a space between the first side and the first baffle defining a disulfide liquid compartment. The stack is positioned above the disulfide liquid compartment. There is a second baffle extending upward from the bottom of the tank and having a second height less than the first height, the second baffle positioned between the first baffle and the second side and extending from the front side to the back side, a space between the second baffle and the second side defining an alkali compartment. There is a third baffle spaced apart from the bottom of the tank, the third baffle positioned between the first and second baffles and extending from the front side to the back side, the bottom of the third baffle being at a height less than the second height, the top of the third baffle being at a height greater than the first height.

Another aspect of the invention involves a method of separating a mixed stream comprising a rich alkali liquid, liquid disulfide compounds, and rich air. In one embodiment, the method includes introducing the mixed stream into a separation zone as described above. The mixed stream is separated into a liquid phase comprising the liquid disulfide compounds and the rich alkali liquid and a gas phase comprising the rich air and disulfide compound vapors, the liquid disulfide compounds forming a layer on the rich alkali liquid. The liquid disulfide compounds are passed over the first baffle into the disulfide liquid compartment and out through the disulfide liquid outlet. The rich alkali liquid is passed under the third barrier, and over the second barrier into the alkali compartment, and out through the alkali liquid outlet.

BRIEF DESCRIPTION OF THE DRAWING

The FIGURE illustrates one embodiment of a process for removing sulfur from an alkaline stream.

DETAILED DESCRIPTION OF THE INVENTION

The present invention meets this need by providing an improved separation zone. The separation zone includes a disulfide separator tank with a stack to separate the disulfide oil and other liquefied hydrocarbons (if any) from the treated rich alkali phase positively. The excess air is discharged into the atmosphere after passing through an absorbent zone, such as a charcoal canister, to absorb vapors of disulfides and other hydrocarbons which otherwise would cause odor or other environmental issues. In some embodiments, in addition to the absorbent zone, a wash oil disulfide scrubber could be integrated into the stack of the disulfide separation zone to remove the bulk of disulfide vapors and thereby maximizing the absorbent life and performance.

Both the sulfides and the mercaptides present in the rich alkali are oxidized to the respective thiosulfates/sulfates and disulfides salts in the sulfide oxidation reactor. The thiosulfates/sulfates remain in the alkali along with any amines and di-ethanol urea that might be present in the rich alkali feed from the removal of carbonyl sulfide (COS). The bulk of the disulfide compounds will be separated from the alkali in the disulfide separation zone, which has three baffles, properly positioned and elevated to enhance the separation.

In some embodiments, a coalescing medium may be used for increased separation between the alkali and the liquid disulfides.

In some embodiments, a disulfide vapor scrubber can be included. In this case, the stack would be positioned directly above the disulfide oil compartment so that the wash oil from the scrubber would fall into the disulfide oil compartment and exit with the liquid disulfide oil.

The absorbent zone comprises one or more absorbers. In some embodiments, the absorbent zone comprises a set of two parallel absorbers (one operating and one spare) are positioned downstream of the vapor outlet to improve the air quality before discharging it into the atmosphere.

The FIGURE illustrates one embodiment of the process 100. Generally, a sulfur rich alkaline stream 105 can be obtained from a hydrocarbon purification process. Such a hydrocarbon purification process can include contacting a hydrocarbon stream with an alkaline stream to facilitate the removal of sulfur. Afterwards, rich alkali is removed from the process. The sulfur rich alkaline stream 105 can comprise a portion of this rich alkali, although other alkaline streams may be comprised instead or additionally. The sulfur rich alkaline stream 105 may contain about 1% to about 30%, or about 1% to about 10%, or about 1% to about 6%, by weight, of an alkali material.

In some embodiments, one or more additional streams (not shown) can be added to the sulfur rich alkaline stream

105, for example, a stripped sour water steam, an oxygen-containing (typically air) stream, and/or a carbon dioxide containing stream.

The sulfur rich alkaline stream 105 is sent to a sulfide oxidation zone 110 where the sulfide compounds are oxidized to thiosulfates/sulfates, and the mercaptan compounds are oxidized to the disulfides salts.

The sulfur rich alkaline stream 105 can be combined with an oxidation catalyst and an air stream 115. The oxidation catalyst can be any suitable oxidation catalyst, such as a sulfonated metal phthalocyanine, such as those described in US Publication No. 2014/0202963. However, any suitable oxidation catalyst can be used such as those described in, for example, U.S. Pat. No. 7,326,333.

The oxidation catalyst, the air stream 115, and the sulfur rich alkaline stream 105 can be combined before or after entering the sulfide oxidation zone 110. The rich aqueous alkali and air mixture is distributed in the sulfide oxidation zone 110. In the sulfide oxidation zone 110, the mercaptans catalytically react with oxygen and water to yield alkali and organic disulfides. Optionally, the sulfide oxidation zone 110 can include packing, such as carbon rings, to increase the surface area for improving contact between the rich alkali and the catalyst.

The sulfide oxidation zone 110 can operate at a temperature of about 25° to about 150° C., and a pressure of about 440 kPa to about 1,830 kPa, or about 35° C. to about 95° C., and a pressure of about 790 kPa to about 1,480 kPa.

In some embodiments, there are two or more reactors in sulfide oxidation zone 110. The effluent from one or more reactors can be passed through a cooler (not shown).

An effluent 120 is withdrawn from the sulfide oxidation zone 110. The effluent 120 can include alkali, one or more hydrocarbons, one or more sulfur compounds, and gases/vapors. Typically, the effluent 120 includes a vapor phase, and a liquid phase. The liquid phase can include liquid disulfide compounds, and liquid aqueous alkali. Generally, the gas/vapor phase includes air with at least some oxygen depletion. In the gas phase, the oxygen content can be about 5-about 21%, by mole.

The effluent 120 is introduced into the separation zone 125. The separation zone 125 includes a tank 130 with a stack 135, and an absorbent zone 230.

The tank 130 has first and second sides 140, 145. There is a first baffle 150 which is located between the first and second sides 140, 145. The first baffle 150 extends up from the bottom 155 of the tank 130 from the front side to the back side, defining a disulfide liquid compartment 160.

There is a second baffle 165 which is located between the first baffle 150 and the second side 145. The second baffle 165 extends up from the bottom 155 of the tank 130 from the front side to the back side, defining an alkali compartment 170.

The first and second baffles 150, 165 define a separation compartment 175.

The height $h_2$ of the second baffle 165 is less than the height $h_1$ of the first baffle 150.

There is a third baffle 180 which is positioned between the first and second baffles 150, 165. The third baffle 180 extends from the front side to the back side of the tank 130. The bottom of the third baffle 180 is lower than the height $h_2$ of the second baffle 165, and the top of the third baffle 180 is higher than the height $h_1$ of the first baffle 150. The bottom of the third baffle 180 is spaced apart from the bottom 155 of the tank 130.

The effluent 120, which contains rich alkali, liquid disulfide compounds, and gas, enters through the inlet 183 and flows into the separation compartment 175 at an inlet below a top of the first baffle 150. The effluent 120 separates into a liquid phase and a gas phase.

The liquid phase contains the rich alkali and the liquid disulfide compounds. The liquid disulfide compounds 185 are lighter than the alkali 190 and form a layer on top of the alkali 190. The height $h_1$ of the first baffle 150 is set so that the layer of liquid disulfide compounds 185 flows over the top of the first baffle 150 into the disulfide liquid compartment 160 without allowing the alkali 190 to flow over it and into the disulfide liquid compartment 160. The liquid disulfide compounds 185 flow out of the disulfide liquid compartment 160 through the disulfide liquid outlet 195 located below the top of the first baffle 150.

The alkali 190 flows under the bottom of the third baffle 180 and over the top of the second baffle 165 into the alkali compartment 170 and out through the alkali liquid outlet 200 which is below the top of the second baffle 165.

The third baffle 180, the top of which is higher than the first baffle 150, prevents the liquid disulfide compounds 185 from flowing over the top of the second baffle 165.

In some embodiments, a coalescing medium 205 is present in the separation compartment 175 between the first and third baffles 150, 180. The top of the coalescing medium 205 is at a height $h_3$ which is greater than the height $h_1$ of the first baffle 150. The coalescing medium 205 will typically extends up from the bottom 155 of the tank 130. The coalescing medium 205 helps to remove liquid disulfide compounds 185 from the alkali 190, improving the separation of the liquid disulfide compounds 185 and the alkali 190. In some embodiments, the coalescing medium 205 is made of a material having primarily oleophilic properties. Suitable materials include, but are not limited to, surface-modified cellulosic material, and polymeric materials. In some embodiments, the coalescing medium 205 is made of hydrophilic materials. Suitable hydrophilic materials include, but are not limited to, fiberglass, stainless steel coated with fluoropolymer, and polypropylene. In some embodiments, there could be more than one coalescing medium 205.

The gas phase enters the stack 135. In some embodiments, there is a disulfide scrubber 210 in the stack 135. A lean wash oil 215 is introduced into the disulfide scrubber 210 and the disulfide compounds are transferred from the gas phase to the lean wash oil 215. This forms a disulfide rich wash oil 220 which flows down into the disulfide liquid compartment 160 and out through the disulfide liquid outlet 195 with the liquid disulfide compounds 185.

The gas exits the stack 135 through the gas outlet 225 and flows to the absorbent zone 230. The absorbent zone 230 includes one or more absorbers 235 which absorb the disulfide compounds. In some embodiments, there are two absorbers 235, 240. The gas flows through the first absorber 235 until it is full, and then the gas is switched to the second absorber 240. The first absorber 235 can then be replaced or regenerated.

The purified gas 245 can be released to the atmosphere or used in another process as needed.

The separation zone 125 can be operated at any suitable conditions, such as no more than about 60° C. and about 250 kPa to about 500 kPa, or about 350 kPa to about 450 kPa.

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated $C_1$, $C_2$, $C_3$ ... $C_n$ where "n" represents the number of carbon atoms in the one or more hydrocarbon molecules. Furthermore, a superscript "+" or "−" may be used with an abbreviated one or more hydrocarbons notation, e.g., $C_{3+}$ or $C_{3-}$, which is inclusive of the abbreviated one or more hydrocarbons. As an example, the abbreviation "$C_{3+}$" means one or more hydrocarbon molecules of three carbon atoms and/or more. In addition, the term "stream" may be applicable to other fluids, such as aqueous and non-aqueous solutions of alkali or basic compounds, such as sodium hydroxide.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "alkali" can mean any substance or material that in solution, typically a water solution, has a pH value greater than about 7.0, and exemplary alkali can include sodium hydroxide, potassium hydroxide, or ammonia. Such an alkali in solution may be referred to as an alkaline solution or an alkaline.

As used herein, the term "phase" may mean a liquid, a gas, or a suspension including a liquid and/or a gas, such as a foam, aerosol, or fog. A phase may include solid particles. Generally, a fluid can include one or more gas, liquid, and/or suspension phases.

As used herein, the term "parts per million" may be abbreviated herein as "ppm" and "weight ppm" may be abbreviated herein as "wppm".

As used herein, the term "about" means within 10% of the value, or within 5%, or within 1%.

As depicted, process flow lines in the FIGURES can be referred to, interchangeably, as, e.g., lines, pipes, branches, distributors, streams, effluents, feeds, products, portions, catalysts, withdrawals, recycles, suctions, and discharges.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Specific Embodiments

While the following is described in conjunction with specific embodiments, it will be understood that this description is intended to illustrate and not limit the scope of the preceding description and the appended claims.

A first embodiment of the invention is a separation zone comprising a tank having an inlet, a disulfide liquid outlet, an alkali liquid outlet, and a stack having a gas outlet, the tank having front and back sides and first and second sides; a first baffle extending upward from the bottom of the tank and having a first height, the first baffle positioned between the first and second sides and extending from the front side to the back side, a space between the first side and the first baffle defining a disulfide liquid compartment, the stack being positioned above the disulfide liquid compartment; a second baffle extending upward from the bottom of the tank and having a second height less than the first height, the second baffle positioned between the first baffle and the second side and extending from the front side to the back side, a space between the second baffle and the second side defining an alkali compartment; and a third baffle spaced apart from the bottom of the tank, the third baffle positioned between the first and second baffles and extending from the front side to the back side, the bottom of the third baffle being at a height less than the second height, the top of the third baffle being at a height greater than the first height. An embodiment of the invention is one, any or all of prior embodiments in this paragraph up through the first embodiment in this paragraph further comprising a coalescing medium positioned between the first and third baffles. An embodiment of the invention is one, any or all of prior embodiments in this paragraph up through the first embodiment in this paragraph wherein the top of the coalescing medium is at a height greater than the first height. An embodiment of the invention is one, any or all of prior embodiments in this paragraph up through the first embodiment in this paragraph wherein the coalescing medium comprises a material having oleophilic properties. The separation zone of the claims further comprising a disulfide scrubber in the stack. An embodiment of the invention is one, any or all of prior embodiments in this paragraph up through the first embodiment in this paragraph further comprising an absorbent zone downstream of the gas outlet. An embodiment of the invention is one, any or all of prior embodiments in this paragraph up through the first embodiment in this paragraph wherein the disulfide liquid outlet is positioned in the disulfide liquid compartment at a level lower than the first height. An embodiment of the invention is one, any or all of prior embodiments in this paragraph up through the first embodiment in this paragraph wherein the alkali liquid outlet is positioned in in the alkali compartment at a level lower than the second height.

A second embodiment of the invention is a method of separating a mixed stream comprising a rich alkali liquid, liquid disulfide compounds, and rich air, the method comprising introducing the mixed stream into a separation zone comprising a tank having an inlet, a disulfide liquid outlet, an alkali liquid outlet, and a stack having a gas outlet, the tank having front and back sides and first and second sides; a first baffle extending upward from the bottom of the tank and having a first height, the first baffle positioned between the first and second sides and extending from the front side to the back side, a space between the first side and the first baffle defining a disulfide liquid compartment, the stack being positioned above the disulfide liquid compartment; a second baffle extending upward from the bottom of the tank and having a second height less than the first height, the second baffle positioned between the first baffle and the second side and extending from the front side to the back side, a space between the second baffle and the second side defining an alkali compartment; and a third baffle spaced apart from the bottom of the tank, the third baffle positioned between the first and second baffles and extending from the front side to the back side, the bottom of the third baffle being at a height less than the second height, the top of the third baffle being at a height greater than the first height; separating the mixed stream into a liquid phase comprising the liquid disulfide compounds and the rich alkali liquid and a gas phase comprising the rich air and disulfide compound vapors, the liquid disulfide compounds forming a layer on the rich alkali liquid; passing the liquid disulfide compounds over the first baffle into the disulfide liquid compartment and out through the disulfide liquid outlet; passing the rich alkali liquid under the third barrier, and over the second barrier into the alkali compartment, and out through the alkali liquid outlet. An embodiment of the invention is one, any or all of prior embodiments in this paragraph up through the second embodiment in this paragraph wherein the separation zone further comprises a coalescing medium positioned between the first and third baffles, and further comprising passing the rich alkali liquid through the coalescing medium before passing the rich alkali liquid under the third baffle. An embodiment of the invention is one, any or all of prior embodiments in this paragraph up through the second embodiment in this paragraph wherein the top of the coalescing medium is at a height greater than the first height. An embodiment of the invention is one, any or all of prior embodiments in this paragraph up through the second embodiment in this paragraph wherein the coalescing medium comprises a material having oleophilic properties. An embodiment of the invention is one, any or all of prior embodiments in this paragraph up through the second embodiment in this paragraph wherein the separation zone further comprises a disulfide scrubber in the stack, and further comprising passing the gas phase through the disulfide scrubber to remove the disulfide compound vapors before passing the gas phase through the absorbent zone. An embodiment of the invention is one, any or all of prior embodiments in this paragraph up through the second embodiment in this paragraph further comprising introducing a wash oil into the disulfide scrubber, the disulfide compounds being transferred to the wash oil; and collecting the wash oil containing the disulfide compounds in the disulfide liquid compartment. An embodiment of the invention is one, any or all of prior embodiments in this paragraph up through the second embodiment in this paragraph wherein the separation zone further comprises an absorbent zone downstream of the gas outlet; and further comprising passing the gas phase through the absorbent zone to remove the disulfide compound vapors. An embodiment of the invention is one, any or all of prior embodiments in this paragraph up through the second embodiment in this paragraph wherein the gas phase alternately passes through a first absorbent bed and a second absorbent bed. An embodiment of the invention is one, any or all of prior embodiments in this paragraph up through the second embodiment in this paragraph wherein the disulfide liquid outlet is positioned in the disulfide liquid compartment at a level lower than the first height. An embodiment of the invention is one, any or all of prior embodiments in this paragraph up through the second embodiment in this paragraph wherein the alkali liquid outlet is positioned in the alkali compartment at a level lower than the second height. An embodiment of the invention is one, any or all of prior embodiments in this paragraph up through the second embodiment in this paragraph wherein the gas phase further comprises hydrocarbon vapors, and further comprising removing the hydrocarbon vapors in the absorbent zone.

A third embodiment of the invention is a method of separating a mixed stream comprising a rich alkali liquid, liquid disulfide compounds, and rich air, the method comprising introducing the mixed stream into a separation zone comprising a tank having an inlet, a disulfide liquid outlet, an alkali liquid outlet, and a stack having a gas outlet, the tank having front and back sides and first and second sides; a first baffle extending upward from the bottom of the tank and having a first height, the first baffle positioned between the first and second sides and extending from the front side to the back side, a space between the first side and the first baffle defining a disulfide liquid compartment, the stack being positioned above the disulfide liquid compartment; a second baffle extending upward from the bottom of the tank and having a second height less than the first height, the second baffle positioned between the first baffle and the second side and extending from the front side to the back side, a space between the second baffle and the second side defining an alkali compartment; a third baffle spaced apart from the bottom of the tank, the third baffle positioned between the first and second baffles and extending from the front side to the back side, the bottom of the third baffle being at a height less than the second height, the top of the third baffle being at a height greater than the first height; and an absorbent zone downstream of the gas outlet; separating the mixed stream into a liquid phase comprising the liquid disulfide compounds and the rich alkali liquid and a gas phase comprising the rich air and disulfide compound vapors, the liquid disulfide compounds forming a layer on the rich alkali liquid; passing the liquid disulfide compounds over the first baffle into the disulfide liquid compartment and out through the disulfide liquid outlet; passing the rich alkali liquid under the third barrier, and over the second barrier into the alkali compartment, and out through the alkali liquid outlet; and passing the gas phase through the absorbent zone to remove the disulfide compound vapors.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A separation zone comprising:
   a tank having an inlet, a disulfide liquid outlet, an alkali liquid outlet, and a stack having a gas outlet, the tank having front and back sides and first and second sides
   a first baffle extending upward from the bottom of the tank and having a first height, the first baffle positioned between the first and second sides and extending from the front side to the back side, a space between the first side and the first baffle defining a disulfide liquid compartment, the stack being positioned directly over the disulfide liquid compartment so that downward flow from the stack flows directly into the disulfide compartment;
   a second baffle extending upward from the bottom of the tank and having a second height less than the first height, the second baffle positioned between the first baffle and the second side and extending from the front side to the back side, a space between the second baffle and the second side defining an alkali compartment; and
   a third baffle spaced apart from the bottom of the tank, the third baffle positioned between the first and second baffles and extending from the front side to the back side, the bottom of the third baffle being at a height less than the second height, the top of the third baffle being at a height greater than the first height.

2. The separation zone of claim 1 further comprising a coalescing medium positioned between the first and third baffles.

3. The separation zone of claim 2 wherein the top of the coalescing medium is at a height greater than the first height.

4. The separation zone of claim 2 wherein the coalescing medium comprises a material having oleophilic properties.

5. The separation zone of claim 1 further comprising a disulfide scrubber in the stack.

6. The separation zone of claim 1 further comprising an absorbent zone downstream of the gas outlet.

7. The separation zone of claim 1 wherein the disulfide liquid outlet is positioned in the disulfide liquid compartment at a level lower than the first height.

8. The separation zone of claim 1 wherein the alkali liquid outlet is positioned in the alkali compartment at a level lower than the second height.

9. A method of separating a mixed stream comprising a rich alkali liquid, liquid disulfide compounds, and rich air, the method comprising:
  introducing the mixed stream into a separation zone comprising:
    a tank having an inlet, a disulfide liquid outlet, an alkali liquid outlet, and a stack having a gas outlet, the tank having front and back sides and first and second sides;
    a first baffle extending upward from the bottom of the tank and having a first height, the first baffle positioned between the first and second sides and extending from the front side to the back side, a space between the first side and the first baffle defining a disulfide liquid compartment, the stack being positioned directly over the disulfide liquid compartment so that downward flow from the stack flows directly into the disulfide compartment;
    a second baffle extending upward from the bottom of the tank and having a second height less than the first height, the second baffle positioned between the first baffle and the second side and extending from the front side to the back side, a space between the second baffle and the second side defining an alkali compartment; and
    a third baffle spaced apart from the bottom of the tank, the third baffle positioned between the first and second baffles and extending from the front side to the back side, the bottom of the third baffle being at a height less than the second height, the top of the third baffle being at a height greater than the first height;
  separating the mixed stream into a liquid phase comprising the liquid disulfide compounds and the rich alkali liquid and a gas phase comprising the rich air and disulfide compound vapors, the liquid disulfide compounds forming a layer on the rich alkali liquid;
  passing the liquid disulfide compounds over the first baffle into the disulfide liquid compartment and out through the disulfide liquid outlet;
  passing the rich alkali liquid under the third barrier, and over the second barrier into the alkali compartment, and out through the alkali liquid outlet.

10. The method of claim 9 wherein the separation zone further comprises a coalescing medium positioned between the first and third baffles, and further comprising:
  passing the rich alkali liquid through the coalescing medium before passing the rich alkali liquid under the third baffle.

11. The method of claim 10 wherein the top of the coalescing medium is at a height greater than the first height.

12. The method of claim 10 wherein the coalescing medium comprises a material having oleophilic properties.

13. The method of claim 9 wherein the separation zone further comprises a disulfide scrubber in the stack, and further comprising:
  passing the gas phase through the disulfide scrubber to remove the disulfide compound vapors.

14. The method of claim 13 further comprising:
  introducing a wash oil into the disulfide scrubber, the disulfide compounds being transferred to the wash oil; and
  collecting the wash oil containing the disulfide compounds in the disulfide liquid compartment.

15. The method of claim 9 wherein the separation zone further comprises an absorbent zone downstream of the gas outlet; and further comprising:
  passing the gas phase through the absorbent zone to remove the disulfide compound vapors.

16. The method of claim 9 wherein the gas phase alternately passes through a first absorbent bed and a second absorbent bed.

17. The method of claim 9 wherein the disulfide liquid outlet is positioned in the disulfide liquid compartment at a level lower than the first height.

18. The method of claim 9 wherein the alkali liquid outlet is positioned in the alkali compartment at a level lower than the second height.

19. The method of claim 9 wherein the gas phase further comprises hydrocarbon vapors, and further comprising removing the hydrocarbon vapors in the absorbent zone.

20. A method of separating a mixed stream comprising a rich alkali liquid, liquid disulfide compounds, and rich air, the method comprising:
  introducing the mixed stream into a separation zone comprising:
    a tank having an inlet, a disulfide liquid outlet, an alkali liquid outlet, and a stack having a gas outlet, the tank having front and back sides and first and second sides;
    a first baffle extending upward from the bottom of the tank and having a first height, the first baffle positioned between the first and second sides and extending from the front side to the back side, a space between the first side and the first baffle defining a disulfide liquid compartment, the stack being positioned directly over the disulfide liquid compartment so that downward flow from the stack flows directly into the disulfide compartment;
    a second baffle extending upward from the bottom of the tank and having a second height less than the first height, the second baffle positioned between the first baffle and the second side and extending from the front side to the back side, a space between the second baffle and the second side defining an alkali compartment;
    a third baffle spaced apart from the bottom of the tank, the third baffle positioned between the first and second baffles and extending from the front side to the back side, the bottom of the third baffle being at a height less than the second height, the top of the third baffle being at a height greater than the first height; and an absorbent zone downstream of the gas outlet;
separating the mixed stream into a liquid phase comprising the liquid disulfide compounds and the rich alkali liquid and a gas phase comprising the rich air and disulfide compound vapors, the liquid disulfide compounds forming a layer on the rich alkali liquid;
passing the liquid disulfide compounds over the first baffle into the disulfide liquid compartment and out through the disulfide liquid outlet;
passing the rich alkali liquid under the third barrier, and over the second barrier into the alkali compartment, and out through the alkali liquid outlet; and
passing the gas phase through the absorbent zone to remove the disulfide compound vapors.

* * * * *